(12) United States Patent
Mastrolia

(10) Patent No.: US 11,338,924 B2
(45) Date of Patent: May 24, 2022

(54) HYDRAULIC THRUST VECTOR YAW CONTROL FOR ROCKET CATAPULT MOTOR ASSEMBLY

(71) Applicant: AMI Industries, Inc., Colorado Springs, CO (US)

(72) Inventor: Bradley Mastrolia, Colorado Springs, CO (US)

(73) Assignee: AMI Industries, INC., Colorado Springs, CO (US)

( * ) Notice: Subject to any disclaimer, the term of this patent is extended or adjusted under 35 U.S.C. 154(b) by 247 days.

(21) Appl. No.: 16/892,972

(22) Filed: Jun. 4, 2020

(65) Prior Publication Data
US 2021/0276722 A1    Sep. 9, 2021

Related U.S. Application Data

(60) Provisional application No. 62/873,645, filed on Jul. 12, 2019.

(51) Int. Cl.
*B64D 25/10*    (2006.01)
*F02K 9/84*    (2006.01)

(52) U.S. Cl.
CPC ............... *B64D 25/10* (2013.01); *F02K 9/84* (2013.01)

(58) Field of Classification Search
CPC ................................. B64D 25/10; F02K 9/84
See application file for complete search history.

(56) References Cited

U.S. PATENT DOCUMENTS

| 4,236,687 A * | 12/1980 | Stone ..................... | B64D 25/10 244/122 AD |
| 4,667,903 A | 5/1987 | Herndone | |
| 7,578,472 B2 * | 8/2009 | Mastrolia .............. | B64D 25/10 244/122 A |
| 2009/0072087 A1 * | 3/2009 | Mastrolia .............. | B64D 25/10 244/122 A |

* cited by examiner

*Primary Examiner* — Justin M Benedik
(74) *Attorney, Agent, or Firm* — Snell & Wilmer L.L.P.

(57) ABSTRACT

A motor cap assembly for an ejection seat may comprise a servo valve assembly, a reservoir a cylinder, a motor cap manifold housing comprising a monolithic body having an internal manifold structure integral to the body configured to communicate a gas between a pressure source and a gas block, and configured to communicate a hydraulic fluid between, the reservoir, the servo valve assembly, and the cylinder, a rack piston disposed within the cylinder and configured to translate axially therein between a base end and a head end of the cylinder, and a motor cap outer housing coupled circumferentially about the motor cap manifold housing, wherein the motor cap outer housing is configured to rotate circumferentially about the motor cap manifold housing in response to an axial translation of the rack piston.

20 Claims, 10 Drawing Sheets

HYDRAULIC THRUST VECTOR YAW CONTROL FOR ROCKET CATAPULT MOTOR ASSEMBLY

CROSS REFERENCE TO RELATED APPLICATIONS

This is a non-provisional application claiming priority to U.S. Provisional Application No. 62/873,645 filed Jul. 12, 2019 and entitled "HYDRAULIC THRUST VECTOR YAW CONTROL FOR ROCKET CATAPULT MOTOR ASSEMBLY," which is incorporated by reference in its entirety for all purposes.

FIELD

The present disclosure relates to escape systems, and more specifically, to ejection seat motor assemblies having thrust vectoring controls.

BACKGROUND

Ejection systems are designed to expel pilots from an aircraft cockpit. Ejection seats in high performance aircraft benefit from safely removing the pilot or other occupant from the stricken aircraft across a wide variety of aircraft speed regimes, altitudes and aircraft attitudes. Generally, the most difficult ejection occurs when the aircraft is at low altitude and at an inverted or other non-upright orientation. Approximately half of aircraft ejection fatalities occur due to insufficient altitude at the time of ejection. Without sufficient altitude, the occupant's recovery parachute cannot fully deploy to bring the occupant safely to the ground. It has long been recognized that an aircraft ejection seat having the capability of assuming an upright orientation irrespective of the aircraft attitude and thereafter gaining sufficient altitude for a safe parachute deployment would be desirable for reducing ejection fatalities.

SUMMARY

In various embodiments, a motor cap assembly for an ejection seat may comprise a servo valve assembly, a reservoir, a gas block, and a motor cap manifold housing comprising a monolithic body having an internal manifold structure integral to the body configured to communicate a gas between a pressure source and the gas block. A rack piston may be disposed within a cylinder defined by the motor cap manifold housing. The rack piston may be configured to translate axially between a base end and a head end of the cylinder. The internal manifold structure of the motor cap manifold housing may be configured to communicate a hydraulic fluid between, the reservoir, the servo valve assembly, and the cylinder. A motor cap outer housing may be coupled circumferentially about the motor cap manifold housing. The motor cap outer housing may be configured to rotate circumferentially about the motor cap manifold housing in response to an axial translation of the rack piston.

In various embodiments, the gas block includes a gas nipple piston configured to translate within the gas block in response to a rotation of the motor cap outer housing. In various embodiments, the motor cap outer housing comprises a gas tap selectively in fluid communication with the gas block via the gas nipple piston. In various embodiments, the cylinder is integral to the motor cap manifold housing. In various embodiments, the cylinder comprises a pinion window. In various embodiments, the rack piston comprises a toothed rack coupled to a pinion gear via the pinion window. In various embodiments, the pinion gear is operatively coupled to a drive ring gear. In various embodiments, the drive ring gear is operatively coupled to a drive ring integral to the motor cap outer housing. In various embodiments, the motor cap assembly comprises a tangible, non-transitory memory configured to communicate with a controller, the tangible, non-transitory memory having instructions stored thereon that, in response to execution by the controller, cause the controller to perform operations comprising determining a current yaw angle, determining a desired yaw angle, and controlling the motor cap manifold housing to a yaw command angle based on the desired yaw angle.

In various embodiments, an ejection seat may comprise a seat pan, a seat back coupled to the seat pan, and a rocket catapult assembly coupled to the seat back including a motor assembly configured to generate a high pressure gas, a nozzle assembly coupled to the motor assembly and configured to receive the high pressure gas, and a motor cap assembly coupled to the motor assembly distal of the nozzle assembly and configured to receive the high pressure gas. The motor cap assembly may comprise a servo valve assembly, a reservoir, a gas block, and a motor cap manifold housing comprising a monolithic body having an internal manifold structure integral to the body configured to communicate the high pressure gas between the motor assembly and the gas block. A rack piston may be disposed within a cylinder defined by the motor cap manifold housing. The rack piston may be configured to translate axially within the cylinder. The internal manifold structure of the motor cap manifold housing may be configured to communicate a hydraulic fluid between, the reservoir, the servo valve assembly, and the cylinder. A motor cap outer housing may be coupled circumferentially about the motor cap manifold housing. The motor cap outer housing may be configured to rotate circumferentially about the motor cap manifold housing in response to an axial translation of the rack piston.

In various embodiments, the gas block includes a gas nipple piston configured to translate within the gas block in response to a rotation of the motor cap outer housing. In various embodiments, the motor cap outer housing comprises a gas tap selectively in fluid communication with the gas block via the gas nipple piston. In various embodiments, the cylinder is integral to the motor cap manifold housing. In various embodiments, the cylinder comprises a pinion window. In various embodiments, the rack piston comprises a toothed rack coupled to a pinion gear via the pinion window. In various embodiments, the pinion gear is operatively coupled to a drive ring gear. In various embodiments, the drive ring gear is operatively coupled to a drive ring integral to the motor cap outer housing. In various embodiments, the motor cap assembly comprises a tangible, non-transitory memory configured to communicate with a controller, the tangible, non-transitory memory having instructions stored thereon that, in response to execution by the controller, cause the controller to perform operations comprising determining a current yaw angle, determining a desired yaw angle, and controlling the motor cap manifold housing to a yaw command angle based on the desired yaw angle.

In various embodiments, an article of manufacture is disclosed including a tangible, non-transitory computer-readable storage medium having instructions stored thereon that, in response to execution by a processor, cause the processor to perform operations comprising transitioning a rocket catapult assembly from an inactive to an active state, retracting a gas nipple piston and breaking a fluid communication between a gas cylinder and a gas port, determining a current yaw angle based on a yaw rate signal, determining a desired yaw angle based on a first pressure signal, and controlling a motor cap assembly to a yaw command angle based on the desired yaw angle. In various embodiments, the operations include determining a thrust based on a second pressure signal, calculating, a yaw moment based on a first gain function of the current yaw angle, the desired yaw angle, and a second gain function, wherein the second gain function is based on the yaw rate signal, and calculating the yaw command angle based on the thrust and the yaw moment.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
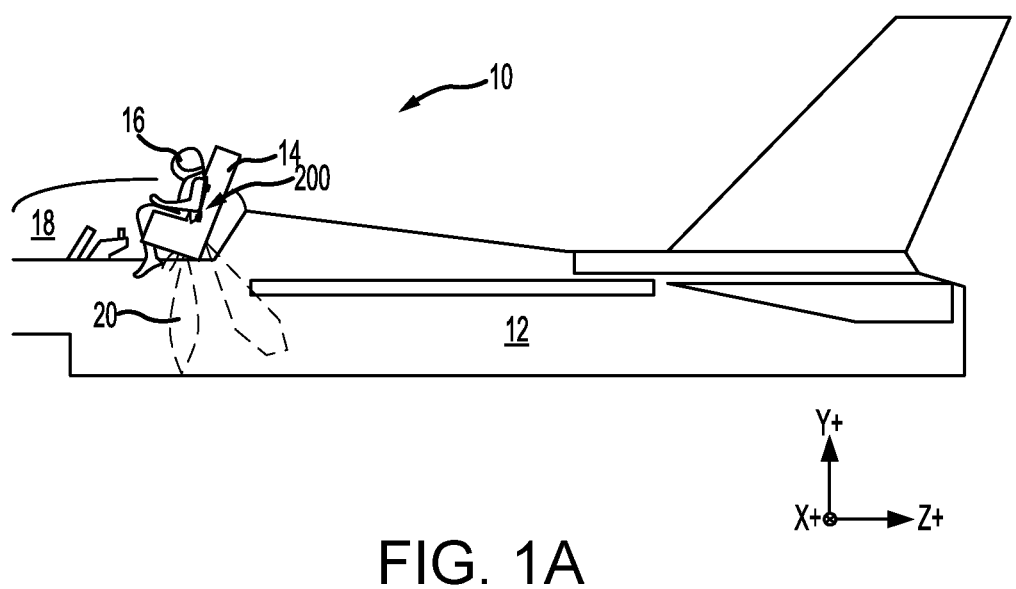
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes rocket catapult assembly 200. Rocket catapult assembly 200 may comprise an element of propulsion system 20 and be configured to extract the ejection seat 14 from cockpit 18.

Figure 1B:
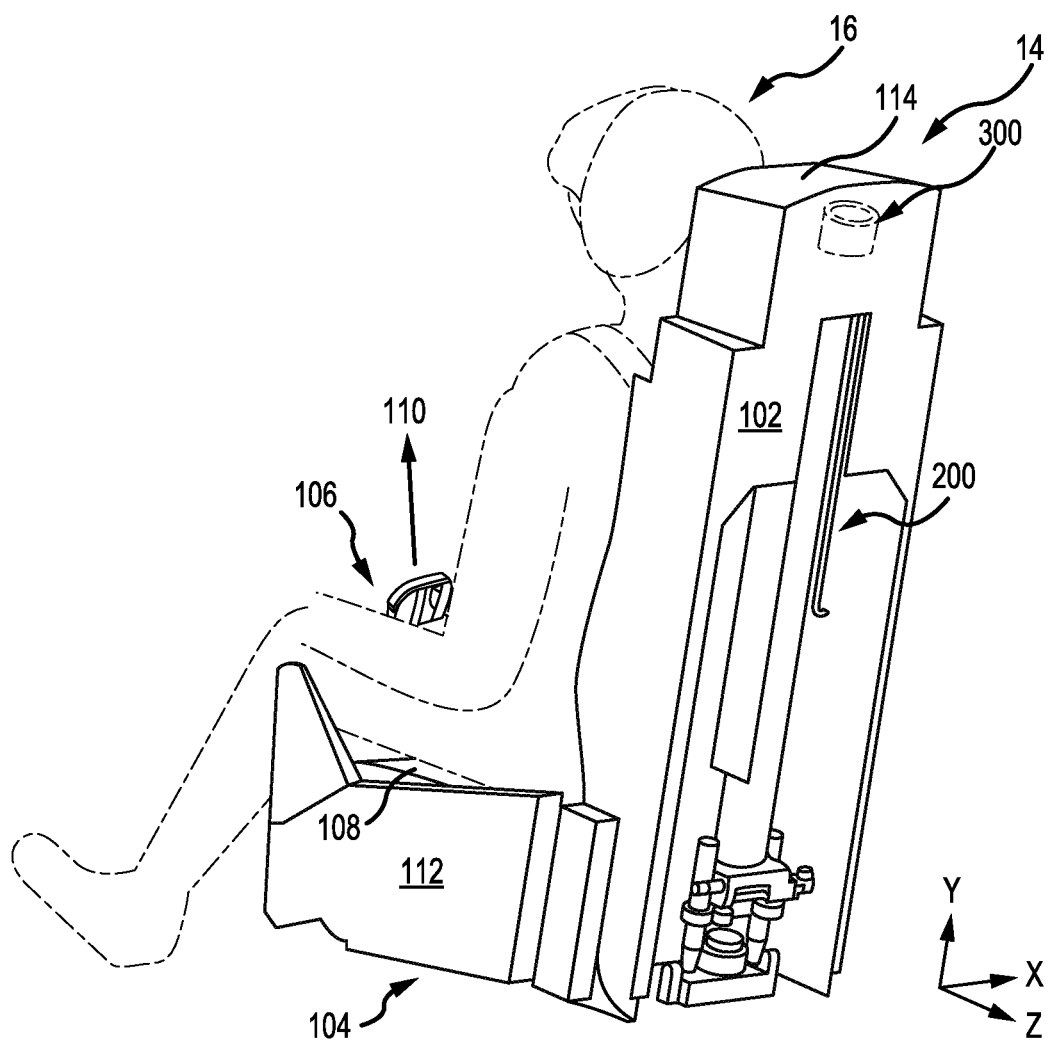
FIG. 1B illustrates an ejection seat having a catapult system in an inactive state, in accordance with various embodiments.

With additional reference to FIG. 1B, ejection seat 14 is illustrated with rocket catapult assembly 200 in an inactive state, in accordance with various embodiments. Ejection seat 14 includes a seat back 102 and a seat pan 104. The rocket catapult assembly 200 is coupled to seat back 102. In various embodiments, an ejection handle 106 may be located proximate a front 108 of seat pan 104. Front 108 of seat pan 104 is generally opposite, or distal, seat back 102. While FIG. 1B shows ejection handle 106 located at front 108 of seat pan 104, it is further contemplated and understood that ejection handle 106 may be located anywhere that is accessible to an occupant of ejection seat 14. For example, ejection handle 106 may be located on a side 112 of seat pan 104 or a headrest 114 of seat back 102.

Figure 2:
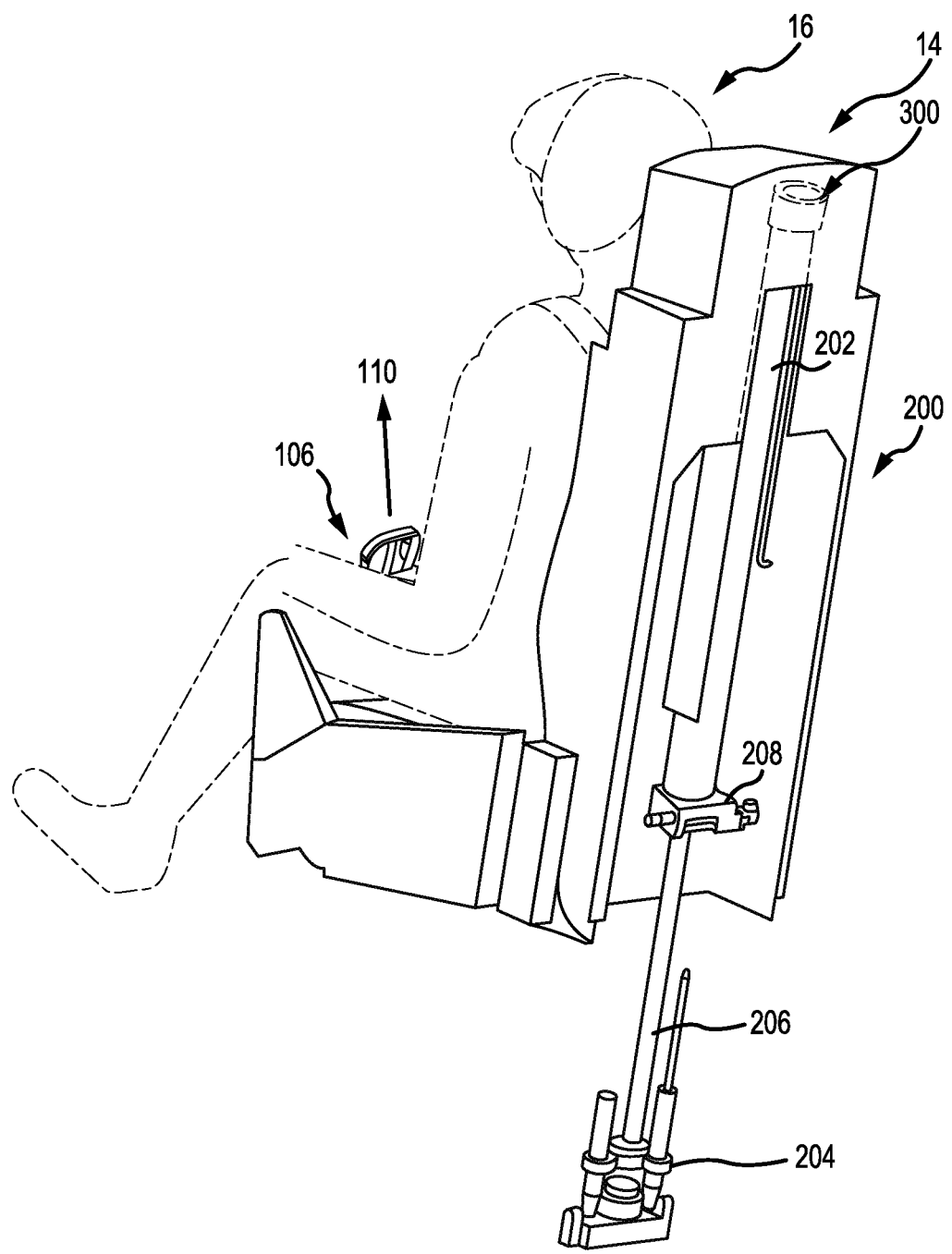
FIG. 2 illustrates an ejection seat having a catapult system in an active state, in accordance with various embodiments.

With additional reference to FIG. 2, ejection seat 14 is illustrated with rocket catapult assembly 200 in an active state, in accordance with various embodiments. Ejection handle 106 may be configured to initiate an ejection sequence upon actuation. For example, occupant 16 pulling ejection handle 106 in the direction of arrow 110 may activate the rocket catapult assembly 200. Rocket catapult assembly 200 may comprise a motor assembly 202, a ram assembly 204, a nozzle assembly 208, and a motor cap assembly 300. In response to activation, the motor assembly 202 may ignite and tend to produce relatively hot, high pressure, gas. Ram assembly 204 may be coupled to the aircraft 12 and comprise a ram 206 disposed within the motor assembly 202. In various embodiments, motor cap assembly 300 may direct a first portion of gas to the ram assembly 204 tending thereby to drive the ram 206 outward of the motor assembly 202 and cause ejection seat 14 to be expelled from cockpit 18. In various embodiments, ram 206 may separate from the motor assembly 202 in response to seat 14 departing from the cockpit 18 and the first portion of gas may be directed to exhaust through nozzle assembly 208 tending thereby to provide a continuous thrust to further separate the seat 14 from the aircraft 12. In various embodiments, the ram assembly 204 may include an integral gas generator which, in response to activation, may drive the ram 206 outward of the motor assembly 202 and cause ejection seat 14 to be expelled from cockpit 18. In various embodiments, the motor assembly 202 may be ignited in response to ram 206 exiting the motor assembly 202.

Figure 3:
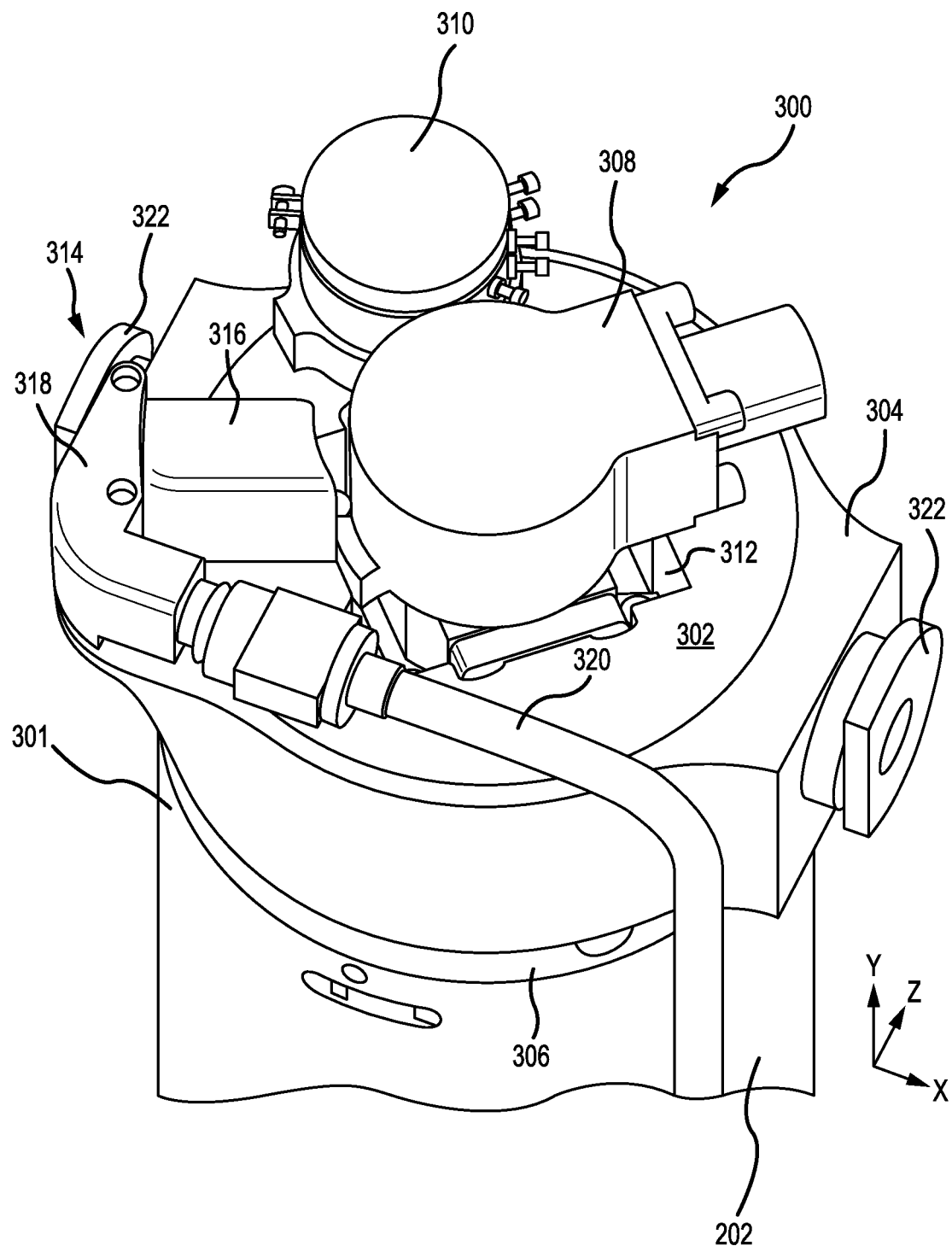
FIG. 3 illustrates a perspective view of a motor cap assembly, in accordance with various embodiments.

In various embodiments and with additional reference to FIG. 3, motor cap assembly 300 is illustrated in perspective view toward a head end 301 of motor assembly 202. The motor cap assembly 300 is coupled to the head end 301 of the motor assembly 202. Head end 301 of the motor assembly 202 is distal, or opposite, of the nozzle assembly 208. Motor cap assembly 300 includes a motor cap manifold housing 302, a motor cap outer housing 304, and a reservoir assembly 306. Motor cap assembly 300 includes a servo valve assembly 308 and a rotation sensor assembly 310 coupled to the motor cap manifold housing 302. In various embodiments, the servo valve assembly 308 may be disposed within a recessed portion 312 of the motor cap manifold housing 302 and, in this regard, may be partially submerged within the motor cap manifold housing 302. Motor cap assembly 300 includes a gas tap assembly 314 configured to supply the high pressure gas to the ram assembly 204.

The gas tap assembly 314 comprises a gas block 316 coupled to the motor cap manifold housing 302 and a gas tap 318 coupled to the motor cap outer housing 304. The gas block 316 and the gas tap 318 may be selectively coupled and in fluid communication. A gas supply line 320 is coupled to the gas tap 318 and the ram assembly 204 and configured to communicate the high pressure gas therebetween. The motor cap outer housing 304 includes trunnions 322 configured to couple the motor cap assembly 300 to the seat back 102. In this regard, the motor cap assembly 300 and the motor assembly 202 may be rigidly coupled to the seat back 102 in the Y and Z-axes but free to rotate at the trunnions 322 about the X-axis.

Figure 4:
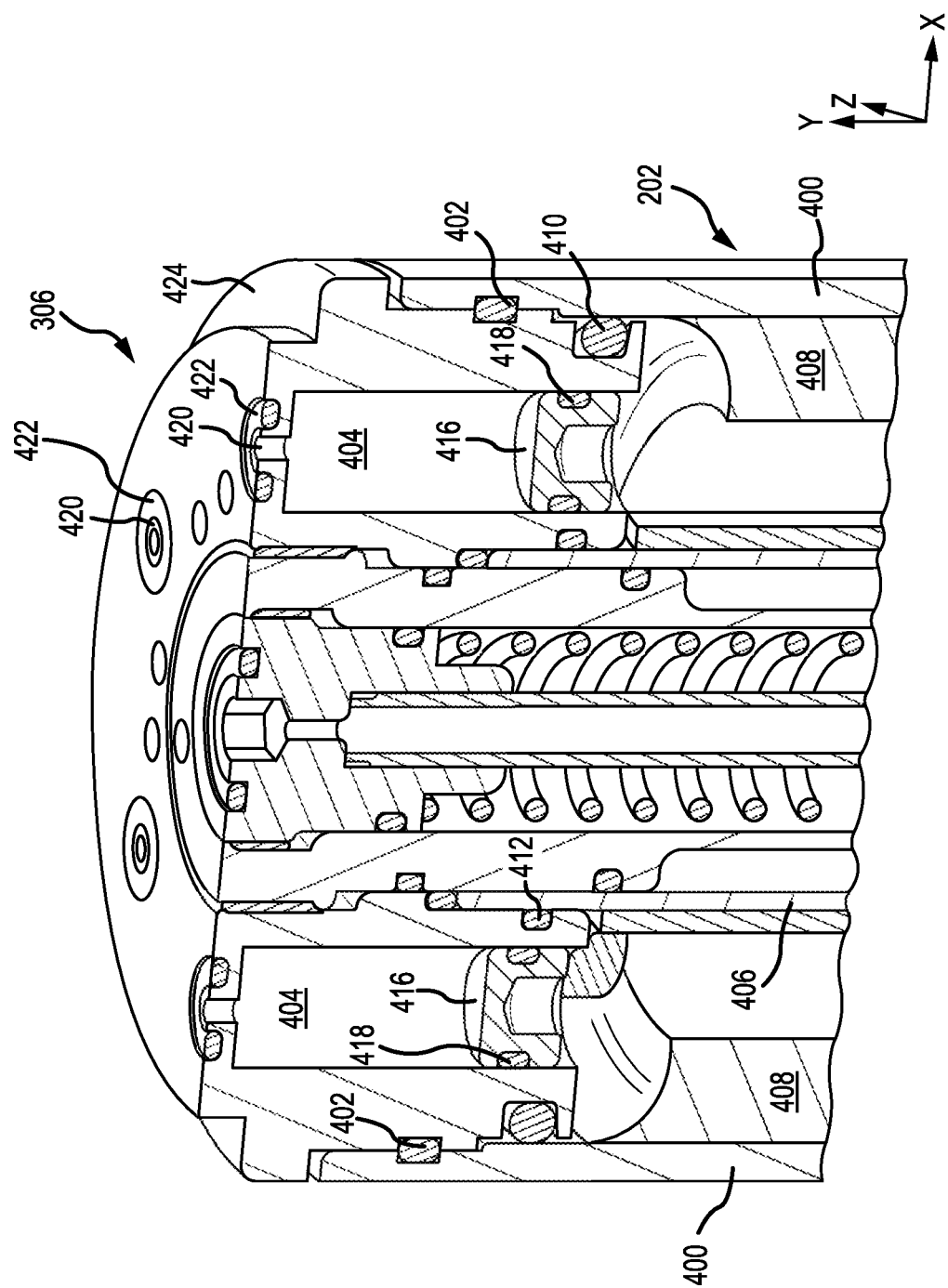
FIG. 4 illustrates a cross section of a reservoir assembly of a motor cap assembly, in accordance with various embodiments.

In various embodiments and with additional reference to FIG. 4, reservoir assembly 306 is illustrated in perspective cross section through the XY-plane providing details of the interior components of the motor cap assembly 300. Reservoir assembly 306 is coupled to the motor assembly 202 at motor outer case 400 by a lock ring 402. The reservoir assembly 306 may comprise an annular, cylindrically-shaped structure defining a plurality of hydraulic reservoirs 404. In various embodiments, the reservoir assembly 306 may include between one and eight reservoirs 404. The reservoirs 404 may extend along the Y-axis between the motor outer case 400 and an inner case 406. In response to transition from an inactive state to an active state, a propellant grain 408 of the motor assembly 202 may ignite and evolve the high pressure gas. The reservoir assembly 306 includes an outer case seal 410 and an inner case seal 412 tending thereby to retain the high pressure gas within the motor assembly 202.

Gas pistons 416 including gas piston seals 418 are inserted into the reservoirs 404 and open to the propellant grain 408. In this regard, the gas pistons 416 may provide an operating pressure to a hydraulic fluid within the reservoirs 404 in response to activation of the motor assembly. In various embodiments, the operating pressure may be about 3000 PSI [20684 kPa] where about in this context is ±20%. The hydraulic reservoirs 404 are in fluid communication with the servo valve assembly 308 and the motor cap manifold housing 302 via supply orifices 420. Each supply orifice 420 may be sealed against a mating surface of the motor cap manifold housing 302 by a supply orifice seal 422. In various embodiments, the reservoir assembly 306 includes a circumferential bearing surface 424 configured to contact the motor cap outer housing 304.

Figure 5:
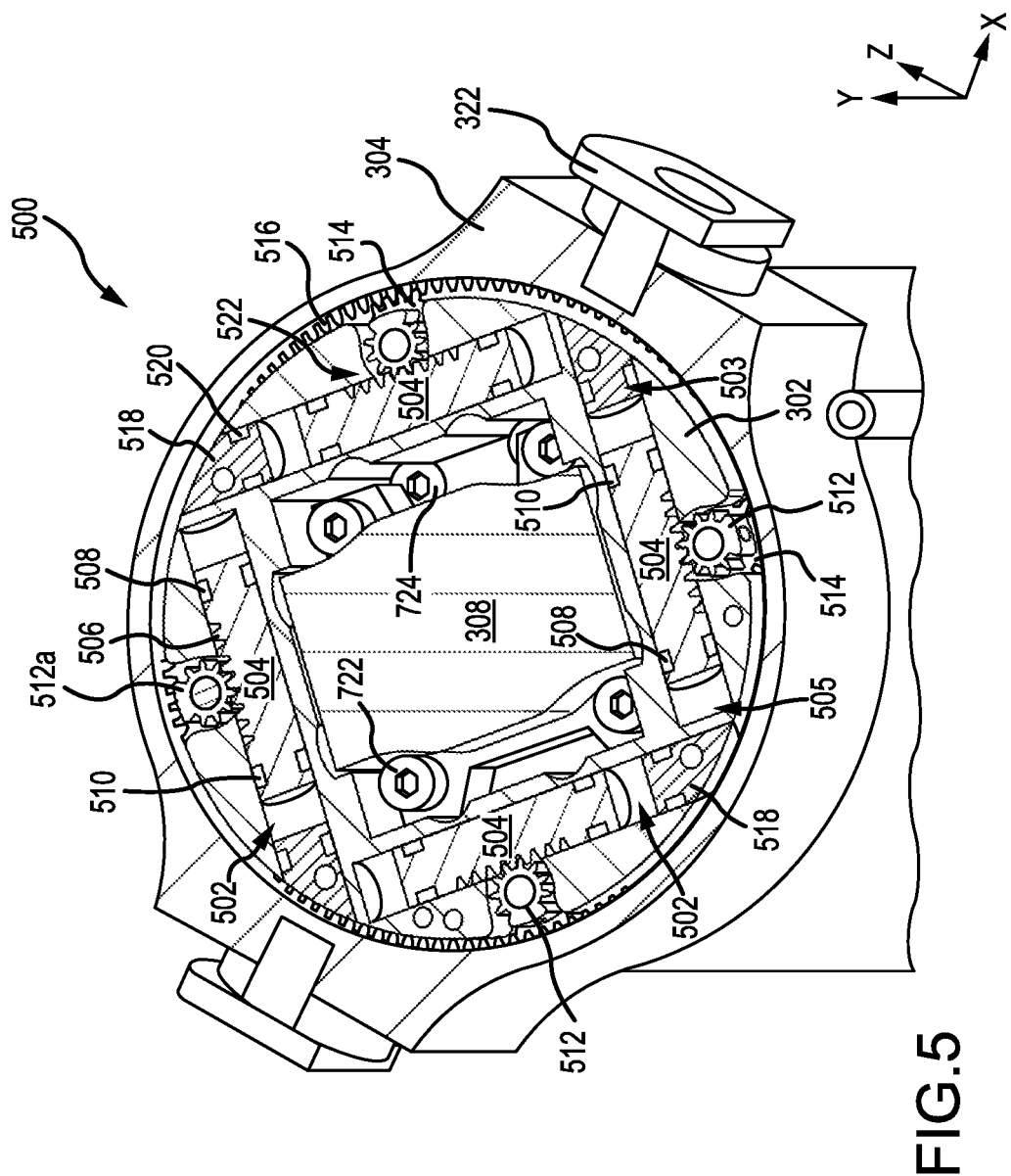
FIG. 5 illustrates a cross section of a motor cap assembly, in accordance with various embodiments.

In various embodiments and with additional reference to FIG. 5, motor cap assembly 300 is illustrated in perspective cross section through the XZ-plane providing details of the interior components 500 of the motor cap manifold housing 302 and the motor cap outer housing 304. Motor cap manifold housing 302 defines one or more cylinders 502. A rack piston 504 may be inserted into each of the cylinders 502. In various embodiments, each of the cylinders 502 is closed at a head end 503 of the cylinder 502 by a cylinder head cap 518 including a cylinder head seal 520. The rack piston 504 includes a toothed rack 506 extending between a base seal 508 and a head end seal 510. The toothed rack 506 of the rack piston 504 is operatively coupled to a pinion gear 512. In various embodiments, motor cap manifold housing 302 defines one or more pinion window(s) 522. The teeth of the pinion gears 512 may protrude into the cylinder bore through the pinion window 522 to contact the toothed rack 506. In this regard, each pinion gear 512 may be intermeshed with a toothed rack 506. In various embodiments, the pinion gear 512 may drive a drive ring gear 514. In various embodiments, the pinion gear 512 may be monolithic with the drive ring gear 514. The motor cap outer housing 304 comprises an annular cylindrical structure coupled circumferentially about the motor cap manifold housing 302. The motor cap outer housing 304 includes a toothed drive ring 516 at the inner diameter of the motor cap outer housing 304.

The drive ring 516 is operatively coupled to the drive ring gears 514 and, in this regard, the motor cap outer housing 304 is configured to rotate (e.g., Y-axis rotation, yaw) circumferentially about the motor cap manifold housing 302 in response to an axial translation of the rack pistons 504 within the cylinders 502. In various embodiments, motor cap manifold housing 302 is rigidly coupled to the reservoir assembly 306 with the motor cap outer housing 304 configured to ride on the bearing surface 424. In various embodiments, a final drive ratio between the rack piston 504 and the drive ring 516 may be 11:17. The motor cap outer housing 304 may be configured to rotate ±10° from a neutral point on the motor cap manifold housing 302.

Figure 6:
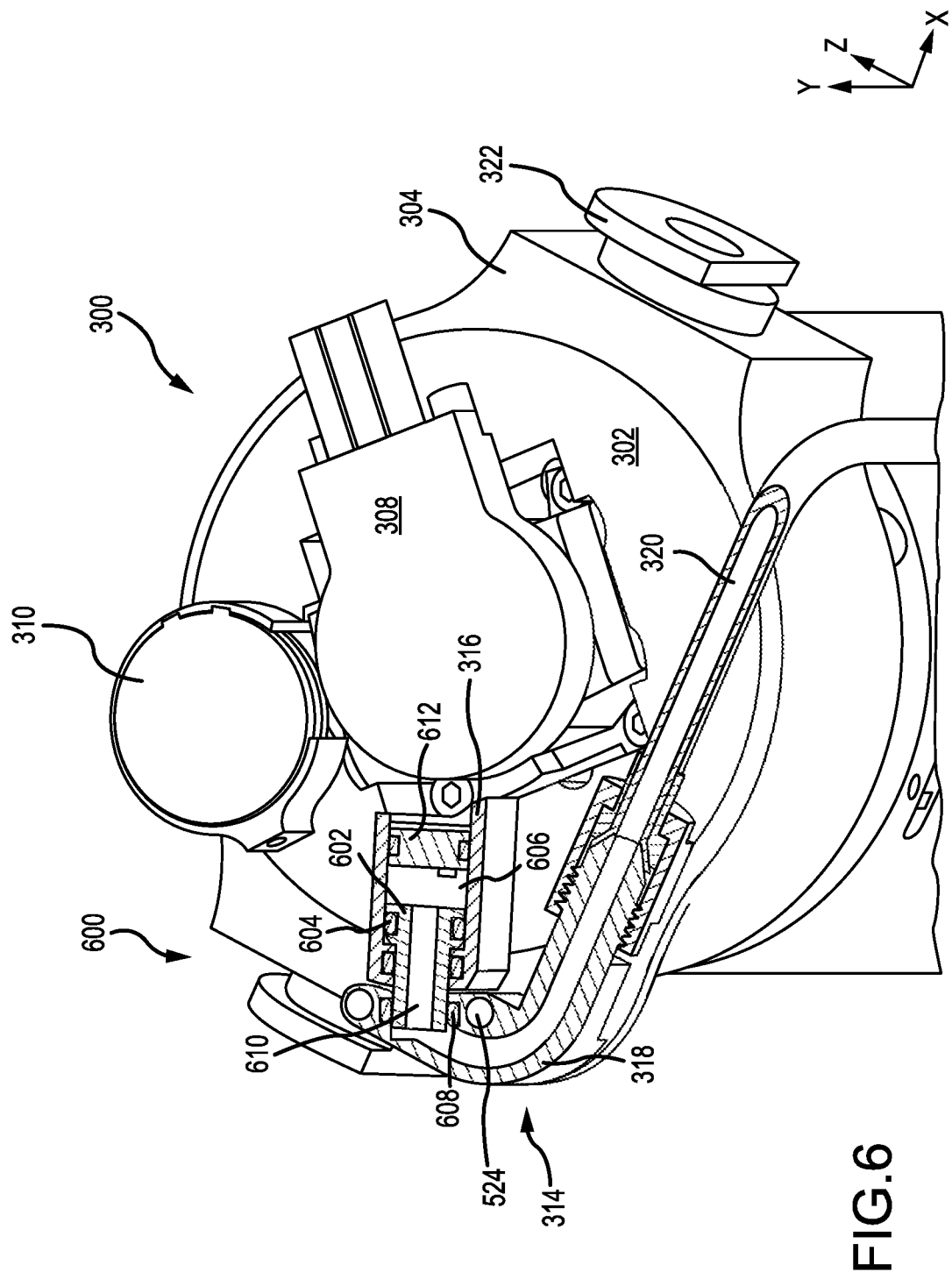
FIG. 6 illustrates a cross section of a motor cap assembly, in accordance with various embodiments.

In various embodiments and with additional reference to FIG. 6, motor cap assembly 300 is illustrated in perspective cross section through the XZ-plane providing details of the interior components 600 of the gas tap assembly 314. Gas block 316 houses a gas nipple piston 602 within a gas cylinder 606 defined by gas block 316. The gas nipple piston 602 includes a nipple piston seal 604 and is configured to translate axially within the gas cylinder 606. The gas nipple piston 602 may extend into the gas tap 318. In this regard, the gas nipple piston 602 may generate a seal at gas tap seal 608 and enable fluid communication between the gas cylinder 606 and the gas tap 318 via passage 610 through gas nipple piston 602. In response to a rotation of the motor cap outer housing 304, the gas nipple piston 602 may retract inward toward gas cylinder head 612 and interrupt fluid communication between the gas cylinder 606 and the gas port 308.

Figure 7:
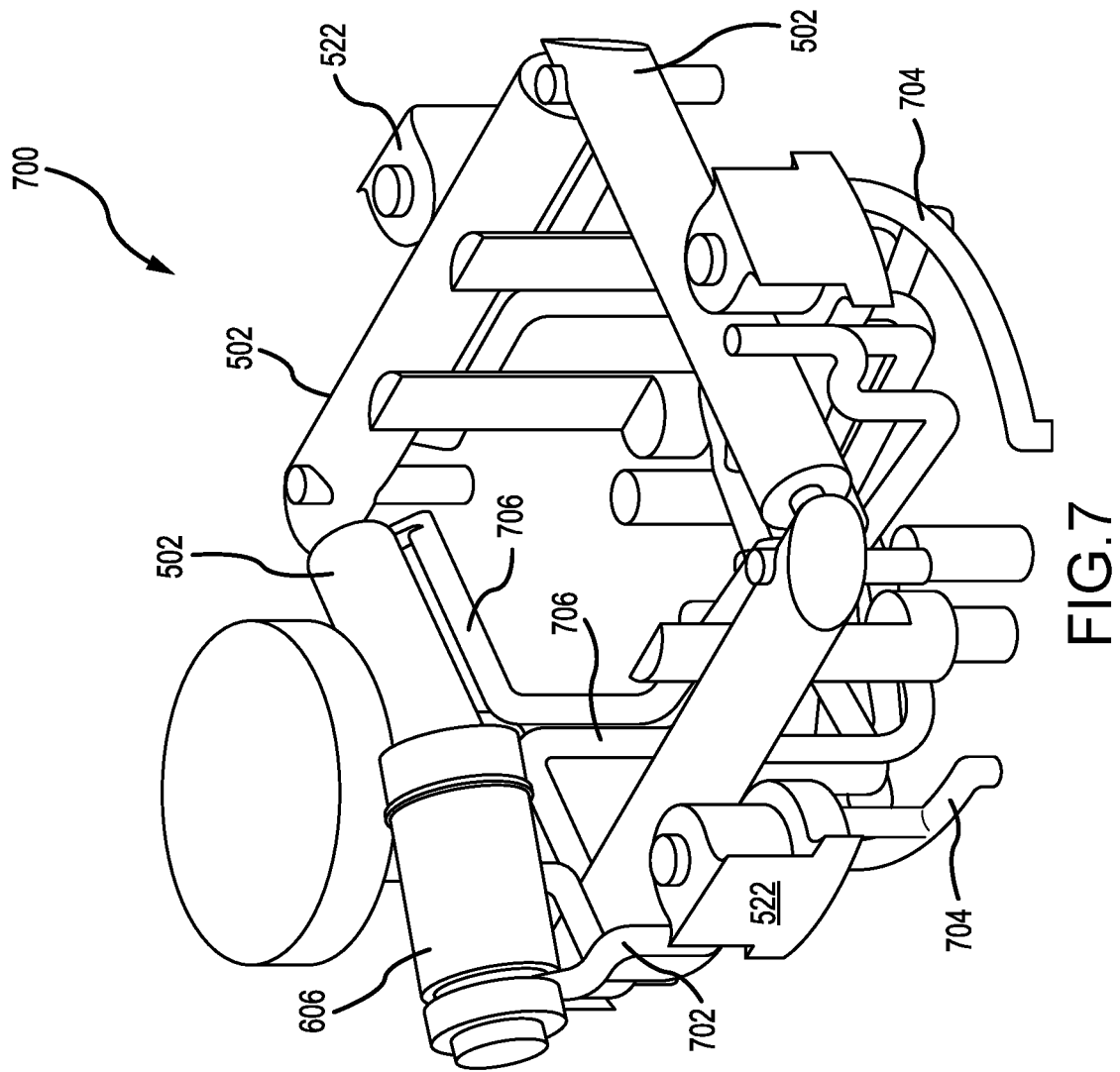
FIG. 7 illustrates a manifold structure of a motor cap assembly, in accordance with various embodiments.

In various embodiments and with additional reference to FIG. 7, an internal manifold structure 700 of motor cap manifold housing 302 is illustrated having negative areas depicted as solid. Motor cap manifold housing 302 may comprise a monolithic body which may be additively manufactured to include gas passages 702 configured to communicate the high pressure gas between the motor assembly 202 and the gas cylinder 606 of gas block 316. The manifold structure may include supply passages 704 in fluid communication between the reservoirs 404 and the servo valve assembly 308. The internal manifold structure 700 includes control passages 706 in fluid communication between the servo valve assembly 308 and the respective head end 503 and base end 505 of the cylinders 502. In this regard, the manifold structure 700 may supply hydraulic fluid at the operating pressure to act on the rack pistons 504.

Figure 8:
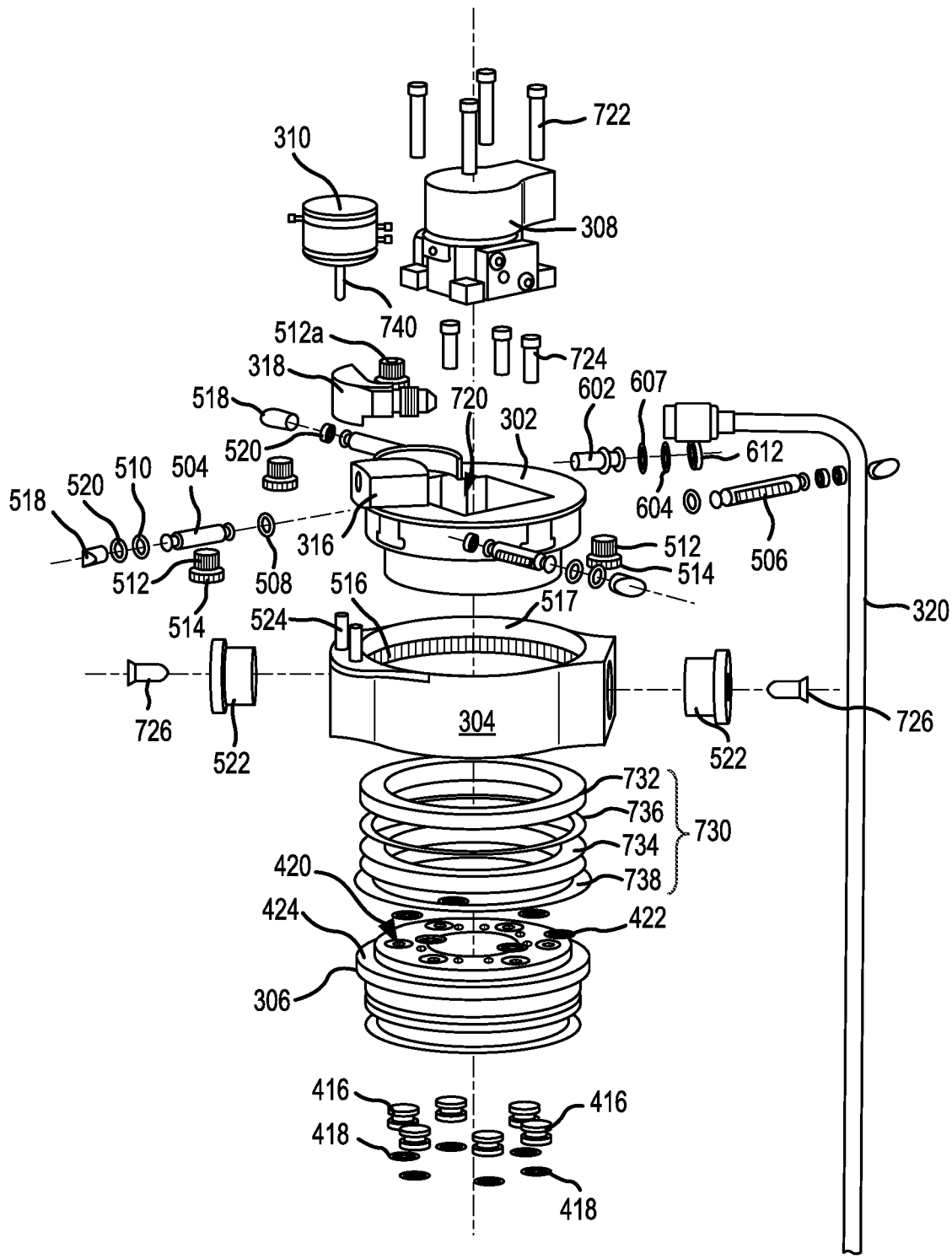
FIG. 8 illustrates an exploded view of a motor cap assembly, in accordance with various embodiments.

With additional reference to FIG. 8, an exploded view of motor cap assembly 300 is illustrated, in accordance with various embodiments. Servo valve assembly 308 may be located within an orifice 720 defined by motor cap manifold housing 302. One or more fasteners 722 may couple servo valve assembly 308 to reservoir assembly 306. In various embodiments, one or more fasteners 724 may couple motor cap manifold housing 302 to reservoir assembly 306. Trunnions 322 may be coupled to motor cap outer housing 304 via fasteners 726.

In various embodiments, a bearing assembly 730 may be located radially between motor cap manifold housing 302 and motor cap outer housing 304. Bearing assembly 730 may include a first ball bearing 732 and a second ball bearing 734. A spacer 736 may be located between first ball bearing 732 and second ball bearing 734. In various embodiments, bearing assembly 730 may further include a retaining ring 738. Bearing assembly 730 may be configured to facilitate translation of motor cap outer housing 304 relative to motor cap manifold housing 302. In various embodiments, motor cap outer housing 304 includes one or more protrusion(s) 524. Protrusion(s) 524 may be configured to secure gas tap 318 to motor cap outer housing 304. For example, in various embodiments, gas tap 318 may define one or more orifice(s) configured to receive protrusion(s) 524.

In various embodiments, a shaft 740 of rotation sensor assembly 310 may extend toward motor cap manifold housing 302. In accordance with various embodiments, shaft 740 may be received by one of the pinion gears 512. For example, a first pinion gear 512a may engage shaft 740, with momentary combined reference to FIG. 5. The motor cap outer housing 304 includes toothed drive ring 516 at the inner diameter 517 of the motor cap outer housing 304. Each of the drive ring gears 514, which are driven by rotation of pinion gears 512, may be engaged (i.e., intermeshed) with toothed drive ring 516 of motor cap outer housing 304. In this regard, translation of a rack piston 504 drives rotation of the pinion gear 512 engaged with the toothed rack 506 of the rack piston 504. Rotation of the pinion gear 512 drives rotation of the drive ring gear 514, which in turn drives rotation of toothed drive ring 516 and motor cap outer housing 304. As described in further detail below, translation of the rack pistons 504 may be controlled controlling the supply of hydraulic fluid and operating pressure acting on the rack pistons 504.

Figure 9:
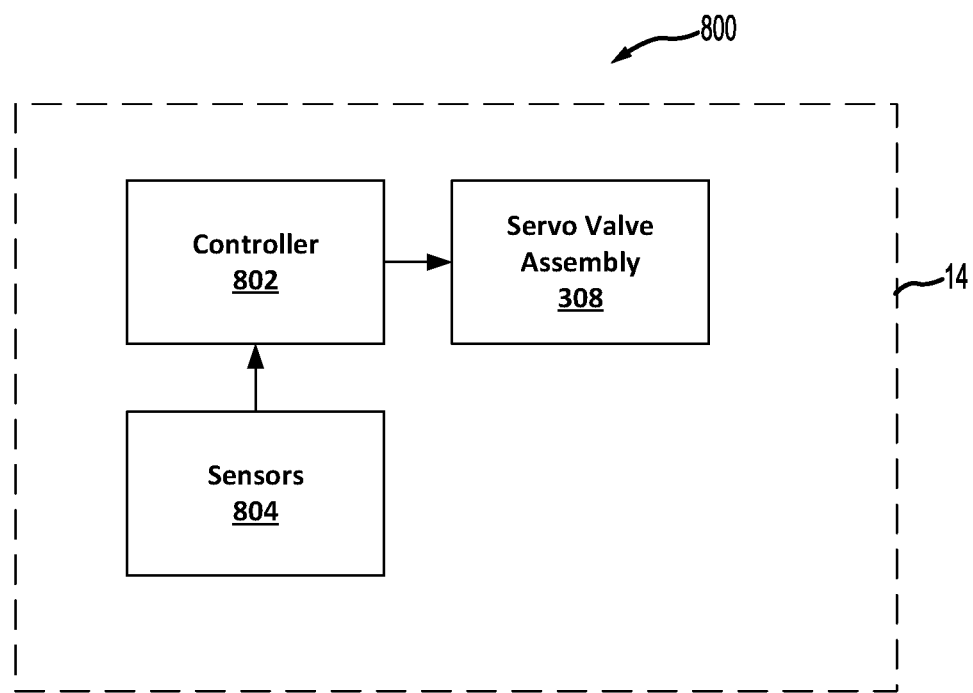
FIG. 9 illustrates a schematic block diagram of a control system for a motor cap assembly, in accordance with various embodiments.

In various embodiments and with additional reference to FIG. 9, a schematic block diagram of a control system 800 for motor cap assembly 300 is illustrated. System 800 includes a controller 802 in electronic communication with sensors 804 and the servo valve assembly 308. In various embodiments, controller 802 may be integrated into computer systems onboard aircraft 12 and/or ejection seat 14. In various embodiments, controller 802 may be configured as a central network element or hub to access various systems, engines, and components of system 800. Controller 802 may comprise a network, computer-based system, and/or software components configured to provide an access point to various systems, engines, and components of system 800. In various embodiments, controller 802 may comprise a processor. In various embodiments, controller 802 may be implemented in a single processor. In various embodiments, controller 802 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 802 may comprise a processor configured to implement various logical operations in response to execution of instructions, for example, instructions stored on a non-transitory, tangible, computer-readable medium configured to communicate with controller 802.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 802 may be in electronic communication with sensors 804 including at least one particulate rotation sensor such as, for example, rotation sensor assembly 310. Sensors 804 may comprise a temperature sensor, a torque sensor, a speed sensor, a pressure sensor, a position sensor, an accelerometer, a mass flow sensor, or any other suitable measuring device known to those skilled in the art. Sensors 804 may be configured to measure a characteristic of aircraft 10 and/or an ejection seat 14 system or component such as rocket catapult assembly 200. Sensors 804 may be configured to transmit measurements to controller 802, thereby providing sensor feedback about the aircraft 12 and ejection seat 14 systems to controller 802. The sensor feedback may be, for example, a speed signal, or may be position feedback, temperature feedback, pressure feedback and/or other data.

In various embodiments, controller 802 may receive an ejection command from the ejection handle 106. In response to the ejection command, the controller 802 may command the rocket catapult assembly 200 to transition from the inactive state to the active state. In response, the motor assembly 202 may ignite the propellant grain 408 and generate the high pressure gas to pressurize the reservoirs 404 and hydraulic fluid therein to the operating pressure. The controller 802 may be configured to send a portion of the gas to the gas block 316. In response to receiving the portion of the gas, the gas block 316 may communicate the portion of the gas to the gas tap 318. In response to receiving the portion of the gas, ram 206 may be driven out of the rocket catapult assembly 200. The hydraulic fluid may flow at the operating pressure through the supply passages 704 of manifold structure 700 (i.e., through channels defined by motor cap manifold housing 302) to the servo valve assembly 308. Controller 802 may control the servo valve assembly 308 to send the hydraulic fluid at the operating pressure through the control passages 706 of manifold structure 700 to the cylinders 502.

In this regard and by controlling the flow of hydraulic fluid via the servo valve assembly 308, the controller 802 may control the traverse of the rack pistons 504 within the cylinders 502, thus causing the motor cap outer housing 304 to rotate about the motor cap manifold housing 302. The controller 802 may receive a yaw rate signal ω from sensors 804 and integrate the yaw rate signal to determine a current yaw angle θ. The controller 802 may receive a first pressure signal from sensors 804 and determine a desired yaw angle ε based on the first pressure signal. The controller 802 may receive a second pressure signal from sensors 804 and determine a thrust T based on the second pressure signal. In various embodiments, the controller 802 may determine a yaw moment M to achieve the desired yaw angle ε based on a first gain function of the current yaw angle θ and the desired yaw angle ε, and a second gain function, wherein the second gain function is based on the of the yaw rate signal ω. The controller 802 may calculate a yaw command angle Ac based on the thrust T and the yaw moment M and command the motor cap outer housing 304 to rotate to the yaw command angle Ac. In various embodiments, the controller 802 may recalculate and adjust the yaw command angle Ac based on a gain function of a yaw angle signal provided by the rotation sensor assembly 310 and the yaw command angle Ac. In various embodiments, the controller 802 may recalculate and adjust the yaw command angle Ac based on a change in the yaw rate signal ω.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A motor cap assembly, comprising:
a servo valve assembly;
a reservoir;
a gas block;
a motor cap manifold housing comprising a monolithic body having an internal manifold structure integral to the monolithic body configured to communicate a gas between a pressure source and the gas block;
a rack piston disposed within a cylinder defined by the motor cap manifold housing, the rack piston being configured to translate axially between a base end and a head end of the cylinder, wherein the internal manifold structure of the motor cap manifold housing is configured to communicate a hydraulic fluid between the reservoir, the servo valve assembly, and the cylinder; and
a motor cap outer housing coupled circumferentially about the motor cap manifold housing, wherein the motor cap outer housing includes a toothed drive ring at an inner diameter surface of the motor cap outer housing, the inner diameter surface being oriented toward an axis about which the motor cap outer housing rotates, and wherein the motor cap outer housing is configured to rotate circumferentially about the motor cap manifold housing in response to an axial translation of the rack piston.

2. The motor cap assembly of claim 1, wherein the gas block includes a gas nipple piston configured to translate within the gas block in response to a rotation of the motor cap outer housing.

3. The motor cap assembly of claim 2, wherein the motor cap outer housing comprises a gas tap selectively in fluid communication with the gas block via the gas nipple piston.

4. The motor cap assembly of claim 3, wherein the cylinder is integral to the motor cap manifold housing.

5. The motor cap assembly of claim 4, further comprising a pinion gear intermeshed with the rack pinion, and wherein the pinion gear is located through a pinion window defined by the motor cap manifold housing.

6. The motor cap assembly of claim 5, wherein the rack piston comprises a toothed rack coupled to the pinion gear via the pinion window.

7. The motor cap assembly of claim 6, further comprising a drive ring gear, wherein rotation of the pinion gear drives a rotation of the drive ring gear.

8. The motor cap assembly of claim 7, wherein the drive ring gear is intermeshed with the drive ring of the motor cap outer housing.

9. The motor cap assembly of claim 1, further comprising a tangible, non-transitory memory configured to communicate with a controller, the tangible, non-transitory memory having instructions stored thereon that, in response to execution by the controller, cause the controller to perform operations comprising:
  determining, by the controller, a current yaw angle;
  determining, by the controller, a desired yaw angle;
  calculating, by the controller, a yaw command angle based on the desired yaw angle; and
  sending, by the controller, a command to the servo valve assembly, the command being configured to rotate the motor cap outer housing to the yaw command angle.

10. An ejection seat, comprising:
  a seat pan;
  a seat back coupled to the seat pan; and
  a rocket catapult assembly coupled to the seat back, the rocket catapult assembly including:
    a motor assembly configured to generate a high pressure gas,
    a nozzle assembly coupled to the motor assembly and configured to receive the high pressure gas, and
    a motor cap assembly coupled to the motor assembly distal of the nozzle assembly and configured to receive the high pressure gas, the motor cap assembly comprising:
      a servo valve assembly;
      a reservoir;
      a gas block;
      a motor cap manifold housing comprising a monolithic body having an internal manifold structure integral to the monolithic body configured to communicate the high pressure gas between the motor assembly and the gas block;
      a rack piston disposed within a cylinder defined by the motor cap manifold housing, the rack piston being configured to translate axially within the cylinder, wherein the internal manifold structure of the motor cap manifold housing is configured to communicate a hydraulic fluid between, the reservoir, the servo valve assembly, and the cylinder; and
      a motor cap outer housing coupled circumferentially about the motor cap manifold housing, wherein the motor cap outer housing includes a toothed drive ring at an inner diameter surface of the motor cap outer housing, the inner diameter surface being oriented toward an axis about which the motor cap outer housing rotates, and wherein the motor cap outer housing is configured to rotate circumferentially about the motor cap manifold housing in response to an axial translation of the rack piston.

11. The ejection seat of claim 10, wherein the gas block includes a gas nipple piston configured to translate within the gas block in response to a rotation of the motor cap outer housing.

12. The ejection seat of claim 11, wherein the motor cap outer housing comprises a gas tap selectively in fluid communication with the gas block via the gas nipple piston.

13. The ejection seat of claim 12, wherein the cylinder is integral to the motor cap manifold housing.

14. The ejection seat of claim 13, wherein the rocket catapult assembly further comprises a pinion gear intermeshed with the rack pinion, and wherein the pinion gear is located through a pinion window defined by the motor cap manifold housing.

15. The ejection seat of claim 14, wherein the rack piston comprises a toothed rack coupled to the pinion gear via the pinion window.

16. The ejection seat of claim 15, wherein the rocket catapult assembly further comprises a drive ring gear, and wherein rotation of the pinion gear drives a rotation of the drive ring gear.

17. The ejection seat of claim 16, wherein the drive ring gear is intermeshed with the drive ring.

18. The ejection seat of claim 10, further comprising a tangible, non-transitory memory configured to communicate with a controller, the tangible, non-transitory memory having instructions stored thereon that, in response to execution by the controller, cause the controller to perform operations comprising:
  determining, by the controller, a current yaw angle;
  determining, by the controller, a desired yaw angle;
  calculating, by the controller, a yaw command angle based on the desired yaw angle; and
  sending, by the controller, a command to the servo valve assembly, the command being configured to rotate the motor cap outer housing to the yaw command angle.

19. An article of manufacture including a tangible, non-transitory computer-readable storage medium having instructions stored thereon that, in response to execution by a processor, cause the processor to perform operations comprising:
  transitioning, by the processor, a rocket catapult assembly from an inactive to an active state;
  retracting, by the processor, a gas nipple piston and breaking a fluid communication between a gas cylinder and a gas port;
  determining, by the processor, a current yaw angle based on a yaw rate signal;
  determining, by the processor, a desired yaw angle based on a first pressure signal;
  calculating, by the processor, a yaw command angle based on the desired yaw angle; and
  commanding, by the processor, a motor cap assembly to rotate to the yaw command angle,
  wherein commanding, by the processor, the motor cap assembly to rotate to the yaw command angle includes sending, by the processor, a command to a servo valve of the motor cap assembly, and wherein the command is configured to cause an axial translation of a rack piston, and wherein a motor cap outer housing of the motor cap assembly rotates circumferentially about a motor cap manifold housing of the motor cap assembly in response to the axial translation of the rack piston, the motor cap outer housing including a toothed drive ring at an inner diameter surface of the motor cap outer housing, the inner diameter surface being oriented toward an axis about which the motor cap outer housing rotates.

20. The article of manufacture of claim 19, wherein the operations further comprise:
  determining, by the processor, a thrust based on a second pressure signal;
  calculating, by the processor, a yaw moment based on a first gain function of the current yaw angle, the desired yaw angle, and a second gain function,
  wherein the second gain function is based on the yaw rate signal; and
  calculating, by the processor, the yaw command angle based on the thrust and the yaw moment.

* * * * *